Aug. 10, 1943.  J. VAVROCH  2,326,267
WINDSHIELD ATTACHMENT
Filed Feb. 24, 1943   2 Sheets-Sheet 1
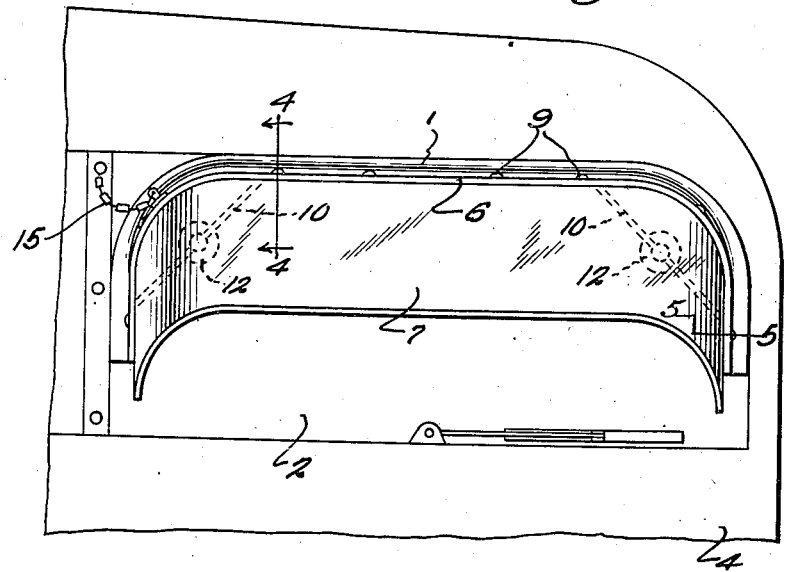
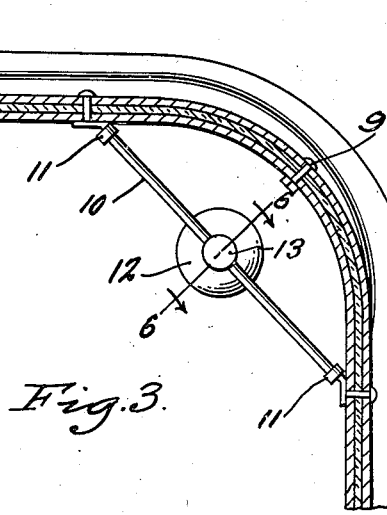
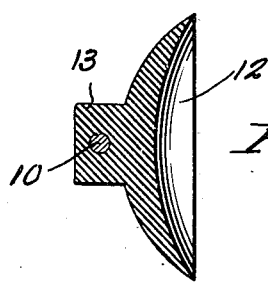
Inventor
Jaroslav Vavroch
By Clarence A. O'Brien
and Harvey B. Jacobson
Attorneys Aug. 10, 1943.   J. VAVROCH   2,326,267
WINDSHIELD ATTACHMENT
Filed Feb. 24, 1943   2 Sheets-Sheet 2
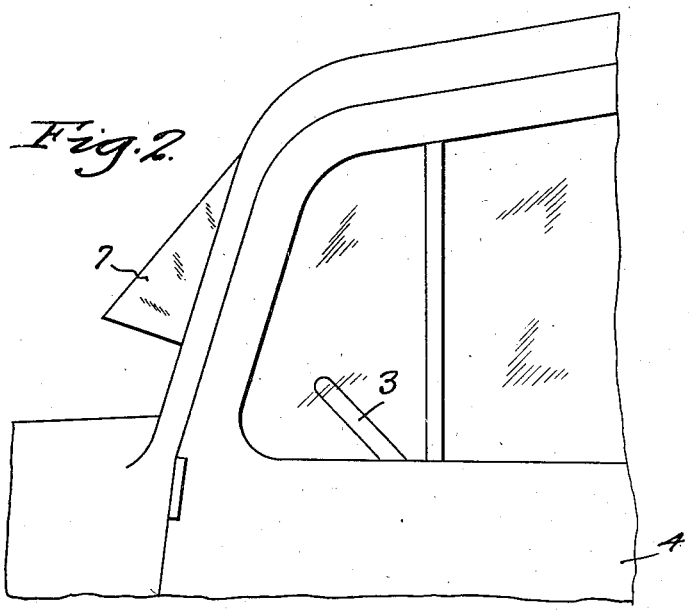
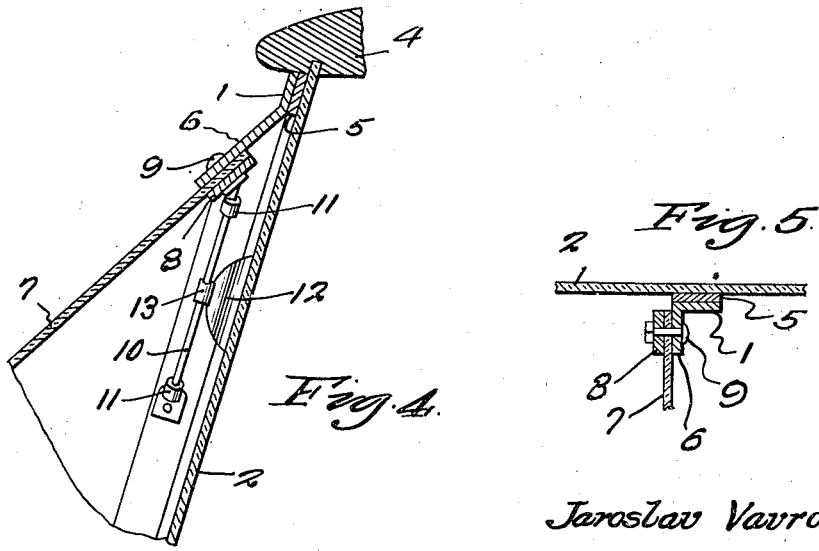
Inventor
Jaroslav Vavroch
By Clarence A. O'Brien
and Harvey B. Jacobson
Attorneys Patented Aug. 10, 1943

2,326,267

UNITED STATES PATENT OFFICE 2,326,267

WINDSHIELD ATTACHMENT

Jaroslav Vavroch, Cedar Rapids, Iowa

Application February 24, 1943, Serial No. 476,952

2 Claims. (Cl. 296—95)

The present invention relates to new and useful improvements in windshield attachments, particularly for motor vehicles, and has for its primary object to provide, in a manner as hereinafter set forth, novel means for preventing the formation or accumulation of ice and snow on the windshield.

Another very important object of the invention is to provide an attachment of the aforementioned character comprising unique means whereby the device may be expeditiously mounted in position on the windshield.

Other objects of the invention are to provide a windshield attachment of the character described which will be comparatively simple in construction, strong, durable, highly efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of an attachment constructed in accordance with the present invention, showing the device mounted in position on an automobile windshield.

Figure 2 is a view in side elevation thereof.

Figure 3 is a vertical sectional view through the device with the lower portions thereof broken away.

Figure 4 is a fragmentary view in vertical section, taken substantially on the line 4—4 of Figure 1.

Figure 5 is a detail view in horizontal section, taken substantially on the line 5—5 of Figure 1.

Figure 6 is a sectional view through one of the vacuum cups, taken substantially on the line 6—6 of Figure 3.

Referring now to the drawings in detail, it will be seen that the embodiment of the invention which has been illustrated comprises a substantially U-shaped frame 1 of suitable material which is adapted to be mounted on the front of a windshield 2 forwardly of the steering wheel 3 of a motor vehicle 4. A pad 5 of suitable material is mounted on the frame 1 for contact with the windshield 2. The frame 1 includes an apertured, angularly extending inner marginal flange 6.

Mounted on the flange 6 of the frame 1 is a hood 7 of suitable transparent material. The hood 7 is firmly secured between the flange 6 and a metallic strip 8 by bolts 9, said strip 8 being tapped to receive said bolts. The hood 7 is of substantially the shape shown to advantage in Figure 1 of the drawings.

Resilient wire rods 10 are mounted diagonally in the corner portions of the frame 1. Brackets or sockets 11 receive the end portions of the rods 10. Resilient vacuum cups 12 are mounted on the rods 10 for engagement with the windshield 2. As illustrated to advantage in Figure 6 of the drawings, the vacuum cups 12 comprise integral lugs or projections 13 through which the rods 10 pass.

Mounted on the inner corner portion of the frame 1 is an eye 14. A safety chain 15 has one end connected to the eye 14 and its other end connected to the vehicle for retaining the attachment in the event that the vacuum cups 12 should work loose.

It is thought that the manner in which the device functions will be readily apparent from a consideration of the foregoing. Briefly, the attachment is mounted on the upper portion of the windshield forwardly of the driver's seat. This, of course, is accomplished by collapsing the vacuum cups 12 against the windshield. These vacuum cups 12 are slidably adjustable on the rods 10 to meet various conditions that may be encountered. The hood 7 protects the windshield from ice and snow, also rain. If desired, two of the attachments may be used, one on each half or side of the vehicle windshield.

It is believed that the many advantages of a windshield attachment constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A windshield attachment comprising a substantially U-shaped frame for mounting on a windshield, a hood mounted on said frame, rods mounted diagonally in the corner portions of the frame, and vacuum cups mounted on said rods and engageable with the windshield for securing the attachment in position thereon.

2. A windshield attachment of the character described comprising a substantially U-shaped frame for mounting on a windshield, said frame including an angularly extending inner marginal flange, a transparent hood mounted on said flange, resilient metallic rods mounted diagonally in the corner portions of the frame, and vacuum cups mounted for sliding adjustment on said rods and engageable with the windshield for securing the attachment in position thereon.

JAROSLAV VAVROCH.